United States Patent
Eisner et al.

(10) Patent No.: US 10,033,868 B2
(45) Date of Patent: Jul. 24, 2018

(54) SYSTEM AND METHOD FOR ANTICIPATING AND PRELOADING DATA IN A CUSTOMER CONTACT CENTER

(71) Applicant: GENESYS TELECOMMUNICATIONS LABORATORIES, INC., Daly City, CA (US)

(72) Inventors: Josef Eric Eisner, Larkspur, CA (US); David Beilis, Toronto (CA); Herbert Willi Artur Ristock, Walnut Creek, CA (US)

(*) Notice: Subject to any disclaimer, the term of this patent is extended or adjusted under 35 U.S.C. 154(b) by 0 days.

(21) Appl. No.: 15/253,759

(22) Filed: Aug. 31, 2016

(65) Prior Publication Data

US 2018/0063327 A1     Mar. 1, 2018

(51) Int. Cl.
| | |
|---|---|
| H04M 3/00 | (2006.01) |
| H04M 5/00 | (2006.01) |
| H04M 3/51 | (2006.01) |
| H04M 3/42 | (2006.01) |

(52) U.S. Cl.
CPC ..... *H04M 3/5183* (2013.01); *H04M 3/42221* (2013.01); *H04M 3/5133* (2013.01); *H04M 3/5175* (2013.01)

(58) Field of Classification Search
CPC .......... H04M 2203/402; H04M 3/523; H04M 3/5232; H04M 2203/40
USPC ............ 379/265.07, 265.06, 265.05, 265.01, 379/266.1, 266.08, 265.11
See application file for complete search history.

(56) References Cited

U.S. PATENT DOCUMENTS

| | | | |
|---|---|---|---|
| 5,115,501 A | 5/1992 | Kerr | |
| 2002/0146108 A1* | 10/2002 | Weissman | H04M 3/5166 379/221.06 |
| 2004/0080535 A1 | 4/2004 | Lueckhoff et al. | |
| 2005/0193055 A1 | 9/2005 | Angel et al. | |
| 2007/0253424 A1* | 11/2007 | Herot | H04L 12/1818 370/395.2 |
| 2007/0294116 A1* | 12/2007 | Stephens | G06Q 10/00 705/5 |
| 2014/0012626 A1 | 1/2014 | Ajmera et al. | |
| 2014/0270135 A1* | 9/2014 | Odinak | H04M 3/5175 379/265.03 |
| 2015/0242860 A1 | 8/2015 | Kannan et al. | |
| 2015/0358460 A1 | 12/2015 | Monegan et al. | |
| 2016/0036981 A1 | 2/2016 | Hollenberg et al. | |
| 2016/0036982 A1 | 2/2016 | Ristock et al. | |
| 2016/0165388 A1 | 6/2016 | Turner et al. | |

OTHER PUBLICATIONS

International Search Report and Written Opinion for Application No. PCT/US2017/048734, dated Dec. 5, 2017, 18 pages.

* cited by examiner

*Primary Examiner* — Thjuan K Addy

(57) ABSTRACT

A method for anticipating and preloading data in a customer contact center, the method comprising: monitoring, by a processor, an interaction of an agent of the customer contact center, with an agent device, during a communication session with a customer of the customer contact center; anticipating, by the processor, data to be accessed during a communication session; pre-loading, by the processor, the data in a memory device; detecting, by the processor, a request for the data; and providing, by the processor, the data for output on the agent device in response to the request.

20 Claims, 10 Drawing Sheets

SYSTEM AND METHOD FOR ANTICIPATING AND PRELOADING DATA IN A CUSTOMER CONTACT CENTER

CROSS-REFERENCE TO RELATED APPLICATION

This application is related to U.S. application entitled "System and Method for Anticipating User Interaction in a Customer Contact Center," filed on even date herewith, the entire content of which is incorporated herein by reference.

FIELD

Aspects of embodiments of the present invention relate to a system and method for anticipating and preloading data in a customer contact center.

BACKGROUND

In order to remain competitive in the modern commerce system, many businesses remain constantly vigilant of evolving consumer demands, and strive to provide customers with the high quality products and services that they desire. To that end, many businesses employ contact centers that include automated systems and representatives of the business to process transactions and/or service the needs of their customers.

In related art systems, contact center agents may utilize a generic or one-size-fits-all user interface, in which agents have access to a wide variety of data and tools for handling interactions. In many instances, such user interfaces may include many features, functions, and tools that are not necessarily relevant to every interaction. Additionally, in order to display data or information to the agent during the communication session, such data is retrieved from some resource in the contact center, which can be time consuming and bandwidth intensive, resulting in inefficiencies during the interaction when customers and agents wait for data to load.

The above information discussed in this Background section is only for enhancement of understanding of the background of the described technology and therefore it may contain information that does not constitute prior art that is already known to a person having ordinary skill in the art.

SUMMARY

Embodiments of the present invention are directed to systems and methods for anticipating and preloading data in a customer contact center.

According to some embodiments of the present invention, in a method for anticipating and preloading data in a customer contact center, the method comprising: monitoring, by a processor, an interaction of an agent of the customer contact center, with an agent device, during a communication session with a customer of the customer contact center; anticipating, by the processor, data to be accessed during a communication session; pre-loading, by the processor, the data in a memory device; detecting, by the processor, a request for the data; and providing, by the processor, the data for output on the agent device in response to the request.

According to some embodiments, the method further includes: refraining from outputting the data on the agent device until the request is detected.

According to some embodiments, the interaction is with a graphical user interface hosted by the agent device.

According to some embodiments, the anticipating is based on anticipating a next interaction of the agent with the agent device.

According to some embodiments, the next interaction is anticipated based on monitoring progress of an agent script.

According to some embodiments, the next interaction is anticipated based on monitoring state of a model of a graphical user interface hosted by the agent device.

According to some embodiments, the memory device is cache memory.

According to some embodiments, the anticipating is based on a location of the customer.

According to some embodiments, the anticipating is based on a time of day of the interaction.

According to some embodiments, the anticipating is based on occurrence of a predefined calendar event.

According to some example embodiments of the present invention, a system for anticipating and preloading data in a customer contact center, the system comprising: a processor; and a memory coupled to the processor, wherein the memory stores instructions that, when executed by the processor, cause the processor to: monitor an interaction of an agent of the customer contact center, with an agent device, during a communication session with a customer of the customer contact center; anticipate data to be accessed during a communication session; pre-load the data in a memory device; detect a request for the data; and provide the data for output on the agent device in response to the request.

According to some embodiments of the present invention, in a system for anticipating and preloading data in a customer contact center, the system includes: means for monitoring an interaction of an agent of the customer contact center, with an agent device, during a communication session with a customer of the customer contact center; means for anticipating data to be accessed during a communication session; means for pre-loading the data in a memory device; means for detecting a request for the data; and means for providing the data for output on the agent device in response to the request.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Generally, modern contact centers are staffed with agents or employees who serve as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls or voice over IP or VoIP calls), video (e.g., video conferencing), text (e.g., emails or text chat), or through other media.

In order to remain competitive, however, businesses constantly strive to provide high quality service to customers while keeping prices low. Employing and training dozens, hundreds, or even thousands of live human agents to handle interactions with customers adds additional overhead costs to the business, which may eventually be passed on to consumers in the form of higher prices for the products or services sold by the business.

Accordingly, embodiments of the present invention are directed to improving efficiency and productivity during interactions, while simultaneously improving the customer experience. Embodiments of the present invention are also directed to providing efficiencies and speed for the various computer resources invoked during such interactions. For example, embodiments of the present invention provide systems and methods for anticipating and preloading data onto computer devices used by agents in a customer contact center. Additionally, embodiments of the present invention provide systems and methods for anticipating user interactions for more quickly invoking computer resources to service those interactions once the interactions arrive at the contact center.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 1:
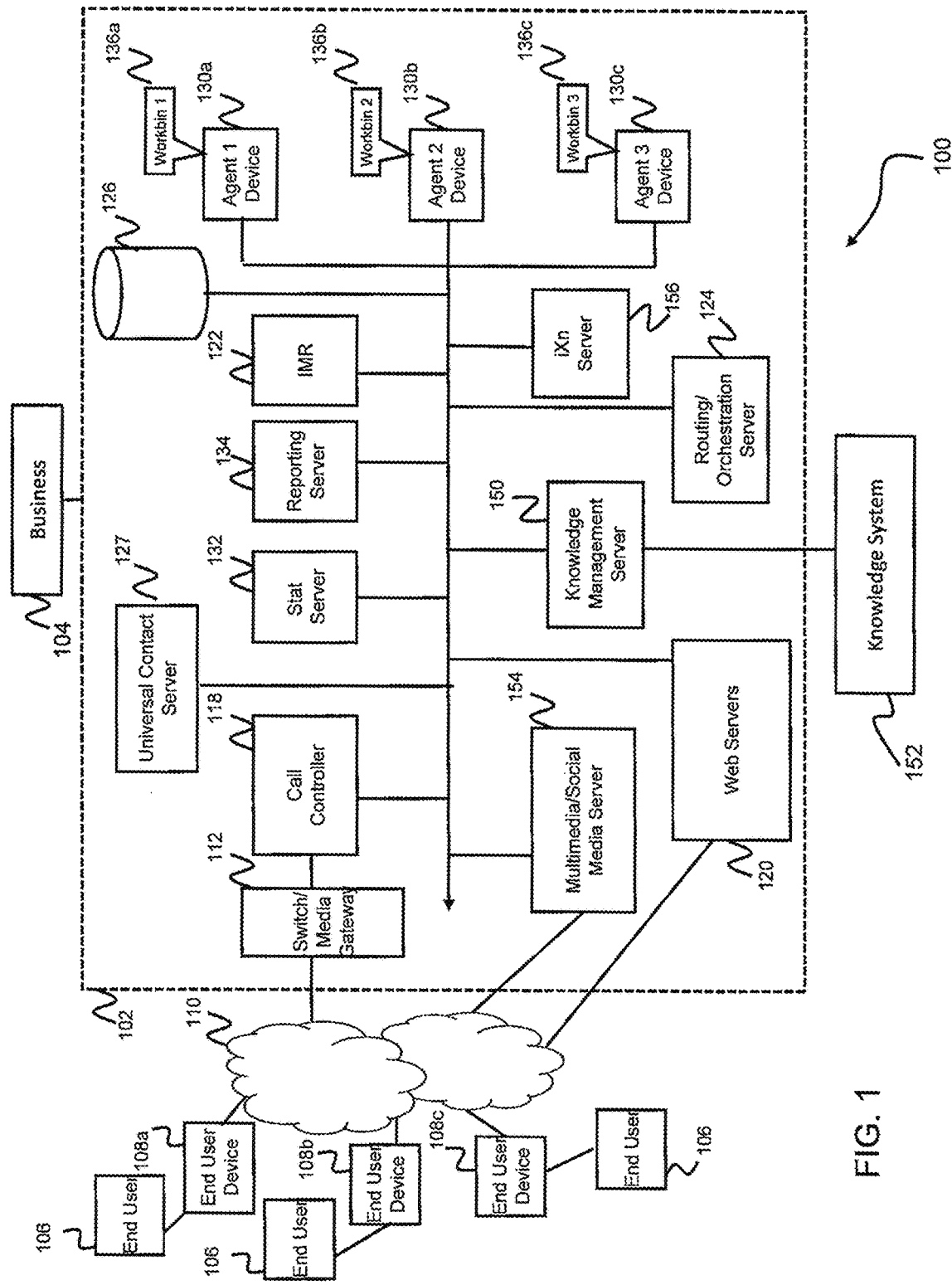
FIG. 1 is a block diagram of a contact center system according to some embodiments of the present invention.

FIG. 1 is a block diagram of a system (hereinafter referred to as a contact center system 100) for anticipating and preloading data and anticipating user interactions in a customer contact center, according to some embodiments of the present invention. In some embodiments, the contact center system 100 may operate as part of a contact center 102. The contact center 102 may be an in-house facility to a business or enterprise 104 for serving the enterprise in performing the functions of sales and service relative to the products and services available through the enterprise. In another aspect, the contact center 102 may be operated by a third-party service provider. According to another embodiment, the contact center 102 may operate as a hybrid system in which some components of the contact center 102 are hosted at the contact center premise and other components are hosted remotely (e.g., in a cloud-based environment). The contact center 102 may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one example embodiment, the contact center 102 includes resources (e.g., personnel, computers, telecommunication equipment, pre-recorded media files for announcements or greetings, self service applications such as IVR, video files, avatars, chatbots, knowledge files, etc.) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end user 106) desiring to receive services from the contact center 102 or the business 104 may initiate an inbound communication to the contact center 102 via their end user devices 108a-108c (collectively referenced as electronic device 108).

Each of the electronic devices 108 may be a communication device conventional in the art, such as, for example, a telephone, wireless phone, smart phone, personal computer, electronic tablet, and/or the like, that is configured to engage in communications with other electronic devices. Users operating the electronic devices 108 may initiate, manage, and respond to telephone calls, emails, chats, text messaging, web-browsing sessions, and other multi-media transactions.

Inbound and outbound communications from and to the electronic devices 108 may traverse the telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, and/or any 3G, 4G, LTE, 5G, or other wireless communications network technology or protocol conventional in the art.

According to one example embodiment, the contact center system 102 includes a switch/media gateway 112 coupled to the communications network 110 for receiving and transmitting telephony interactions between end users and the contact center 102. The switch/media gateway 112 may include a telephony switch or communication switch configured to function as a central switch for agent level routing within the center. The switch may be a hardware switching system or a soft switch implemented via software. In this regard, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony device. In this example, the switch/media gateway establishes a voice path/connection (not shown) between the calling customer and the agent telephony device, by establishing, for example, a connection between the customer's telephony device and the agent telephony device.

According to one example embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some example embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one example embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a Variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center system 102 resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132. The processing logic of the routing/orchestration server 124 may be rules driven, and may leverage, for example, intelligent workload distribution protocols and various business rules for routing the interactions.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, NoSQL, SQLite, and the like, and may be stored in a mass storage device 126. The routing server 124 may query the customer information from the customer database via an ANI or any other information collected by the IMR 122.

Once an appropriate agent is identified as being available to handle a communication, a connection may be made between the customer and an agent device 130a-130c (collectively referenced as 130) of the identified agent. According to some embodiments, the agent may be physically located remotely with respect to the contact center premises. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events. According to some embodiments, the multimedia/social media server 154 may be configured to maintain chat conversations, generate chat transcripts, and determine whether or not a chat communication is completed (e.g., based on timeout or by a customer closing a chat window). Additionally, the multimedia/social media server 154 may be configured to keep a chat session alive even when a particular chat server instance crashes, and also process or facilitate chat transfers and conference sessions.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system 102, the web servers may also be provided by third parties and/or be maintained outside of the contact center. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one example embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin (or group workbins) 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one example embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, survey responses, etc.), and the like.

According to one embodiment, some of the data (e.g. customer profile data) may be maintained in a customer relations management (CRM) database hosted in the mass storage device 126 or elsewhere. The mass storage device may take form of a hard disk or disk array, flash memory, magnetic table, or other suitable mass storage device as is conventional in the art, for storing information used as part of the contact center system 100 and the contact center system 100.

According to some embodiments, the contact center system 102 may include a universal contact server (UCS) 127, configured to retrieve information stored in the CRM database and direct information to be stored in the CRM database. For example, the UCS 127 may be utilized as part of the contact center system 100 to facilitate maintaining a history on how well a particular contact center resource, tool, agent, etc., functions for a given customer or interaction topic as a reference for interactions. The UCS 127 may also be configured to facilitate maintaining a history of customers' preferences. Additionally, the UCS 127 may be configured to capture and store data regarding comments from agents, customer communication history, and the like.

The contact center system 100 may additionally include a knowledge management server 150 for facilitating interactions between customers operating the end user devices 108a-108c and a knowledge system 152 (which may be included as part of the contact center 102, or may be operated remotely by a third party). The knowledge management server 152 is a computer system capable of receiving questions and providing answers as output. According to some example embodiments, the knowledge system may be embodied as IBM Watson®. Of course, any other knowledge system may be used as will be appreciated by a person having ordinary skill in the art. In some embodiments, the knowledge system 152 is an artificial intelligence computer system capable of answering questions posed in natural language by retrieving information from information sources such as encyclopedias, dictionaries, newswire articles, literary works, or other documents submitted to the knowledge system 152 as reference materials, as is well known in the art. Additional details of the knowledge management server is provided in U.S. application Ser. No. 14/449,018, filed on Jul. 31, 2014, entitled "System and Method for Controlled Knowledge System Management," the content of which is incorporated herein by reference.

Referring again to the routing/orchestration server 124, this server is configured to work with the various other components of the contact center system 100 for orchestrating the handling of interactions based on a routing strategy utilized by the particular contact center. Depending on the type of routing strategy (flow) generated for a particular route point of the contact center (e.g. a particular dialed number), and depending on the specific values of parameters set for the routing strategy, different options, media treatments, and routing is performed for the interaction. The routing may involve invoking different media channels as determined by the generated flow. For example, the flow may call for multi-modal interaction where two or more media channels are invoked in parallel, or where the media channel is changed during the course of the same interaction session. In this regard, the orchestration server 124 is configured to transmit message (e.g. SIP messages) to different servers including a SIP server, chat server, email server, and the like, depending on the type of media channel that is invoked.

The contact center system 100 may also include a reporting server 134 configured to generate reports from data aggregated by the statistics server 132, or other resources of the contact center system 100 such as, for example, respective interaction processing servers. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
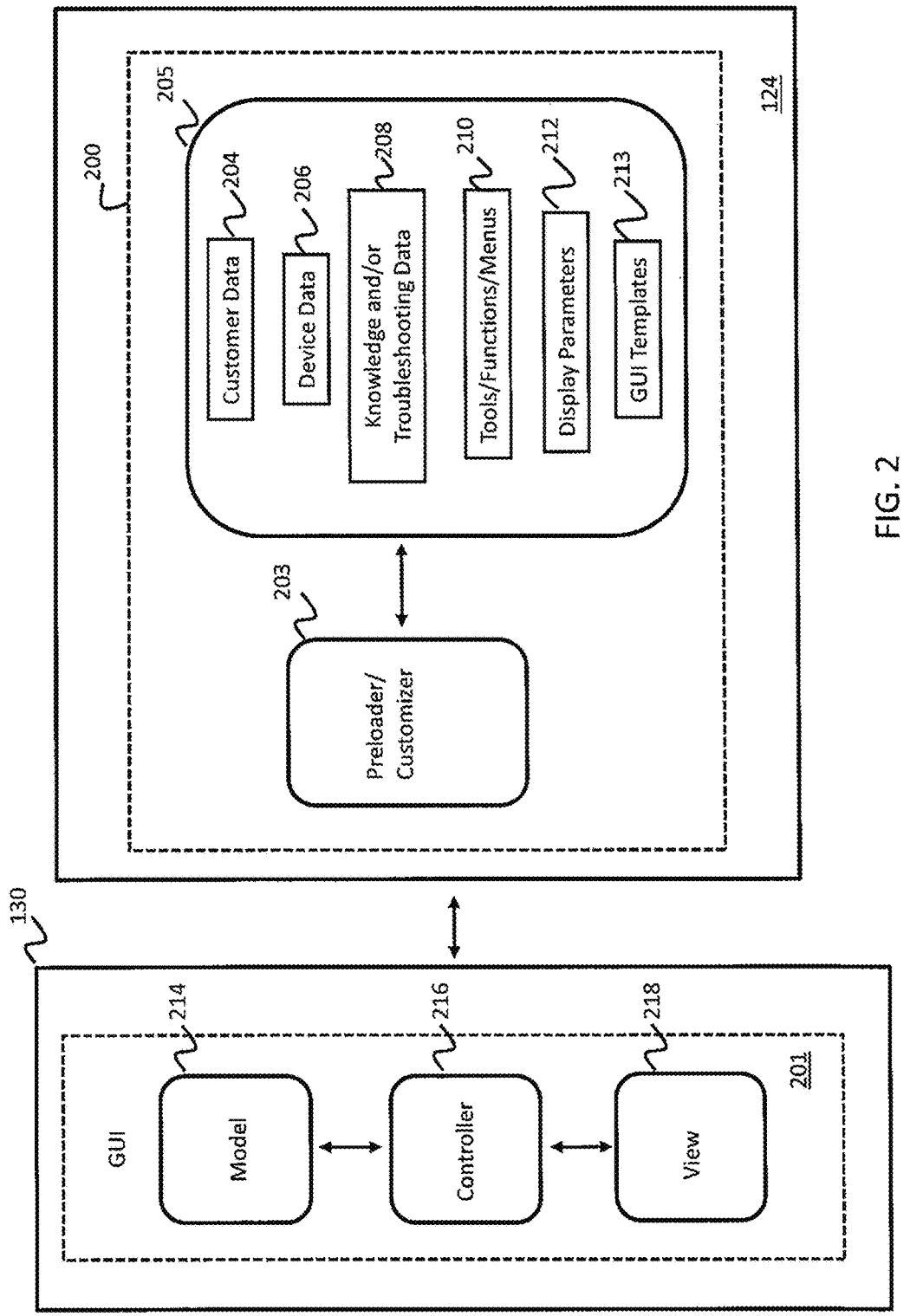
FIG. 2 illustrates a module operating as part of a contact center system for generating and adjusting an agent user interface according to some embodiments of the present invention.

FIG. 2 is a block diagram of an agent desktop configurator 200 for customizing a graphical user interface (GUI) 201 based on observed or predicted activities of an agent operating the particular agent device 130, according to some embodiments of the present invention. The agent desktop configurator 200 may also be configured to preload, as needed, data anticipated to be requested by the agent and/or data that may be useful or utilized for processing a given interaction, regardless of whether or not an agent is aware of such data. According to one embodiment, the preloading occurs prior or during an interaction with a particular customer, before an agent makes a request for the data. According to some embodiments of the present invention, the agent desktop configurator 200 may run on one or more of the components of the contact center system 100. For example, according to some embodiments, such as the embodiment of FIG. 2, the agent desktop configurator 200 may be included as part of the orchestration server 124. In some embodiments, all or a portion of the agent desktop configurator 200 may also be hosted in the individual agent devices 130, and may be configured with all or a portion of the functionality of such module. Such client components may be configured, for example, to monitor an agent's activities or behaviors with the GUI, and provide such monitored data to the agent desktop configurator 200 for preloading GUI data, and for customizing interface options and/or views of the GUI.

According to some embodiments, the agent desktop configurator 200 includes a preloader/customizer module 203 and cache memory 205. The preloader/customizer module 203 may be configured to interact with the agent GUIs 201 to receive data of agent activities or other observed or predicted events, and customize the options, layout, and/or view of the GUI based on the observed or predicted events. For example, the preloader/customizer module 203 may generate and modify various graphical windows, icons, menus, tools, and the like, based on the observations and prediction, for enabling agents to efficiently handle communications or interactions in the contact center environment.

The preloader/customizer module 203 may also be configured to interact with various data sources of the contact center for determining/predicting data to be requested by the GUI 201, and orchestrating the retrieval of such data for storing in the cache 205. For example, the preloader/customizer module 203 may retrieve and store in the cache 205, customer data 204 (e.g., demographic or profile data about a customer), device data 206 (e.g., information about an electronic device, product, or service owned or utilized by a customer), knowledge and/or troubleshooting data 208 (e.g., information about a product or service, answers to customer questions, interaction scripts, data about related products or services for cross/upsell), interface data 210 (e.g., data for providing and displaying various tools, functions, and/or menus for facilitating interactions), one or more display parameters 212, and/or GUI templates 213 for defining various aspects of the graphical look and feel of the user interface of the agent devices 130.

The agent desktop configurator 200 may work in cooperation with any suitable graphical user interface scheme known in the art that may be employed by the GUI 201 of the various agent devices 130. For example, although not limited thereto, the GUIs 130 may operate according to a model-view-controller (MVC) architectural pattern. As will be understood by a person of skill in the art, the MVC architecture includes a model 214, view 216, and controller 218. The model 214 is the data set which is exposed through the view 2016. The model 214, for example, include 2 parts, one being optimized for use at the server side, and the other optimized for use at the GUI side. The view 216 operates as an output graphical representation of data to be displayed to an agent. The controller 218 receives input (e.g., from input devices coupled to the agent devices 130 owned or operated by the agents), and converts the input to commands for the model 214 or view 216. According to one embodiment, the model 214 may store the data that is retrieved according to commands from the controller 216 and displayed in the view 218. According to one embodiment, such data may be preloaded to the cache, and made available to the model 214 as soon as a request is made by the controller 216. When the model changes based on new data provided to the model, the view 216 may generate new output to the user based on those changes. The controller 218 may send commands to the model 214 to update the state of the model 214. According to some embodiments, the controller 218 may also send commands to the view 216 to change the presentation of the view.

According to some embodiments, the agent desktop configurator 200 may mimic all or a portion of the MVC architecture. For example, the agent desktop configurator 200 may mimic the model 214 component of the MVC architecture. In another example, the mimicking of the MVC architecture may allow the generating of a virtual GUI that may be preloaded for display, but not actually rendered on an agent device as discussed in further detail below. The creating of the virtual GUI may be accompanied by the creating of a virtual interaction object as is described in further detail in U.S. application Ser. No. 15/216,622, filed on Jul. 21, 2016, entitled "Virtual Interactions in Contact Center Operations," the content of which is incorporated herein by reference.

Although the agent GUI 201 may be implemented by utilizing an MVC architectural pattern, embodiments of the present invention are not limited thereto. That is, the agent GUI 201 may be implemented using any suitable graphical user interface scheme or architecture for generating, modifying, storing, and transmitting data, functions, tools, windows, and the like as part of a graphical user interface for an agent desktop for managing interactions with customers.

Additionally, in a related art system, there may be delay or latency when an agent device 130 attempts to retrieve data during an interaction from the contact center system 100 as it is needed. By pre-configuring the agent desktop session and transferring the pre-configured agent desktop session to the selected agent's local communication device, certain data, such as information about the customer or tools for assisting the customer, that may be utilized during the interaction may be preloaded or stored locally thereby improving efficiency and reducing such latency during the interaction.

According to one embodiment, the agent GUI 201 may be deemed to be a self-configuring GUI that is adapted to collect analytical data from the agent device 130, to reconfigure the agent desktop/GUI. According to one embodiment, the reconfigured desktop allows greater efficiencies for the agent. In this regard, the agent GUI 201 may start off with a standard/default configuration that may be appropriate for the particular agent's experience, role, and the like. The GUI may then be reconfigured (e.g. periodically) based on agent interactions with the GUI. The reconfiguration may include, for example, enabling or disabling components of the GUI visible to the user (e.g. menu items, icons, and the like), enabling or disabling tool tips and help bubbles, and/or rearranging existing GUI components. In one embodiment, an appropriate GUI template stored in the data cache 205 or mass storage device 126 may be identified based on the collected data for achieving the reconfiguration. In some embodiments, GUI parameters of the agent device 130 may be altered to achieve the reconfiguration. Analytical data for re-configuring the agent desktop may be obtained, for example, by observing the agent's interactions with the GUI. For example, the preloader/customizer module 203 of the agent desktop configurator 200 may observe the agent repeatedly moving his or her mouse from lower right of the screen to the upper left, to actuate a specific GUI component. In response to detecting such repeated action, the GUI component may be moved from the upper left portion of the screen to a mid-right location, to be closer in sequence to a prior activity.

In some embodiments, the GUI may be reconfigured based on knowledge about the user. For example, the preloader/customizer module 203 may identify the user as an expert user that prefers working with a command line interface, as opposed to a less frequent user that may need more GUI guidance. In this case, the user interface may be customized to enable such command line interface. According to some embodiments, the GUI may be reconfigured based on the speech analytics input from a previous part of the call when the call is transferred to a supervisor. Additionally, according to some embodiments, when an interaction is transferred from one agent to another agent, the transferring agent's GUI information could be passed as well, for example, the data that is preloaded and the views that are being utilized by the transferring agent, thereby enabling the subsequent agent to continue where operating from where the transferring agent left off. Other embodiments may further include reducing screen navigation switching, adjusting or reconfiguring the GUI according to customer input (e.g., how customers drive the interaction flow), and generating personalized GUI screens according to individual agents' preferences.

In some embodiments, an agent's handle time may be monitored to determine whether the agent's desktop should be reconfigured to make him more efficient. For example, if the preloader/customizer module 203 detects that more time is taken to handle an interaction because the agent is repeatedly invoking the knowledge management server 150 to search for items in the knowledge system 152 to address a service inquiry, the module 203 may reconfigure the GUI 201 so that a knowledge widget is made persistent on the desktop for easy and convenient access.

Figure 3:
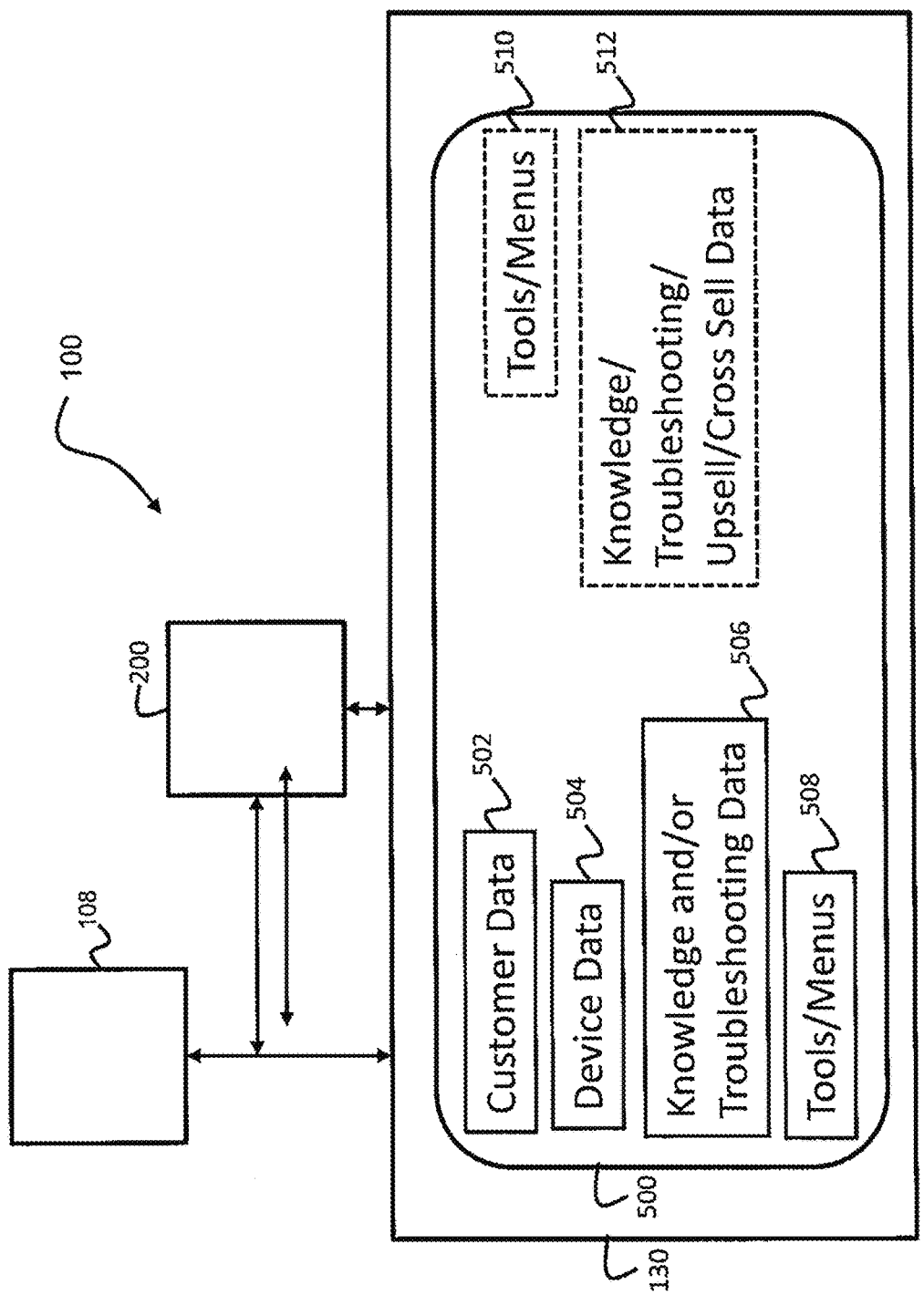
FIG. 3 is a block diagram illustrating a system for anticipating data to be utilized by an agent during an interaction, according to some embodiments of the present invention.

According to some embodiments, the preloader/customizer module 203 may compare data collected from the agent device 130, to desktop configurations (and clickstreams) of most productive agents or of those with highest customer satisfaction ratings, and reconfigure the desktop according to the configuration used by those agents who also most closely fit the workstyle, demographics, and/or situations of that particular agent FIG. 3 is a block diagram of a system for anticipating and preloading data to be utilized by an agent during an interaction, according to some embodiments of the present invention. According to one embodiment, an agent desktop 500 may run a GUI (such as GUI 201 of FIG. 2) that provides various information and tools relevant to an ongoing or upcoming interaction with a customer operating the customer device 108. For example, the agent desktop 500 may be configured to display customer data 502 (including various demographic or profile data about the customer operating the customer device 108), device data 504 (including information about one or more electronic devices owned or operated by the customer), knowledge and/or troubleshooting data 506 (e.g., articles, videos, troubleshooting or interaction scripts, frequently asked questions and answers, etc.), and interface tools, icons, or menus 508.

During the course of the interaction between the agent operating the agent device 130 and the customer operating the customer device 108, the preloader/customizer module 203 of the agent desktop configurator 200 may anticipate next GUI actions of the agent based on monitoring current agent interactions with his/her desktop. The preloader/customizer module 203 may proactively load the GUI model 214 data in response to such anticipation.

The anticipation may be based on monitoring progress of an agent script that an agent follows in handling an interaction. The preloader/customizer may be configured to determine an agent's progress in the script (e.g. by monitoring interactions that match certain activities called for in the script), and look ahead in the script to predict a next activity to be undertaken by the agent.

In some embodiments, the anticipation may be based on monitoring a path of a current GUI state model that is being followed, which may match a modeled path that is typical for similar types of interactions between agents and customers. In this regard, the path of the GUI state model for an interaction associated with a specific customer type and/or intent may be used to predict/anticipate data that is to be requested next. For example, if at the end of addressing the intent of the interaction a coupon, upsell, or cross sell offer is anticipated to be provided, the preloader/customizer module 203 may preload such data into the cache 205.

In another example, resolution of a specific customer intent may typically lead to a subsequent issue or topic for which knowledge and/or troubleshooting data may be needed. Such additional knowledge and/or troubleshooting data 512 may be anticipated based on the progression of the path of the GUI state model, and preloaded into the cache 205 for actual display on the desktop 500 when requested by the agent.

In a further example, if a customer is ordering a particular product or service, the preloader/customizer module 203 may predict or anticipate that the agent may request information about the product or service, or a related product or service, to display on the agent desktop 500 be then be conveyed to the customer during the interaction.

In yet another example, anticipation of data to be needed for an agent may be based on agent scheduling information provided by, for example, a workforce scheduling server (not shown). For example, the desktop configurator 200 may monitor a particular agent's work schedule, and proactively load a data model for a subsequent activity prior to the scheduled start time of that subsequent activity (e.g. when the agent transitions from handling inbound interactions to handling outbound campaigns).

According to one embodiment, multiple calls or interactions with customers regarding a particular topic in which a majority or certain percentage inquired about a specific second topic may trigger the preloader/customizer module 203 to dynamically adjust to display or preload information about the second topic in response to the first topic being raised by the customer.

According to one embodiment, the preloaded data is maintained in the cache 205 and transmitted to the model 214 of the GUI upon request by the controller 216. The controller 216 makes the request as soon as the agent interacts with the GUI to specifically request the preloaded data (e.g. by actuation a menu item, icon, widget, or the like). The view 218 of the agent desktop 500 is then modified in response to the data model 214 to display the preloaded information.

In other examples, the preloader/customizer module 203 may even modify or adjust the configuration or variety of tools and menus available to the agent on the agent desktop 500 depending on the nature and progression of the interaction. For example, if a customer initially wishes to establish or create a new customer account, the tools/menus 508 may initially include an interface for the agent to create a customer profile or account, but after the customer account is created, the tools/menus 508 may be adjusted to display additional interfaces or tools 510 for enabling the agent to assist the customer in ordering a product or service, or troubleshooting a problem the customer is experiencing with a product or service supported by the contact center.

Accordingly, embodiments of the present invention may operate to provide a mechanism to preload or preconfigure information for display on a local agent desktop interface, in anticipation of an agent requesting such information via, for example, his GUI, thereby improving efficiency and effectiveness of interactions by reducing latency that may otherwise occur if such information were only retrieved or generated when the agent specifically requests the information.

According to some embodiments, the preloading of data may be in anticipation of a customer reaching out to the contact center, and may include generating of a virtual GUI in anticipation of such contact. According to some embodiments, the anticipation may be based on data received from customer devices in electronic communication with the contact center system as part of an Internet of Things (IoT) system.

Figure 4:
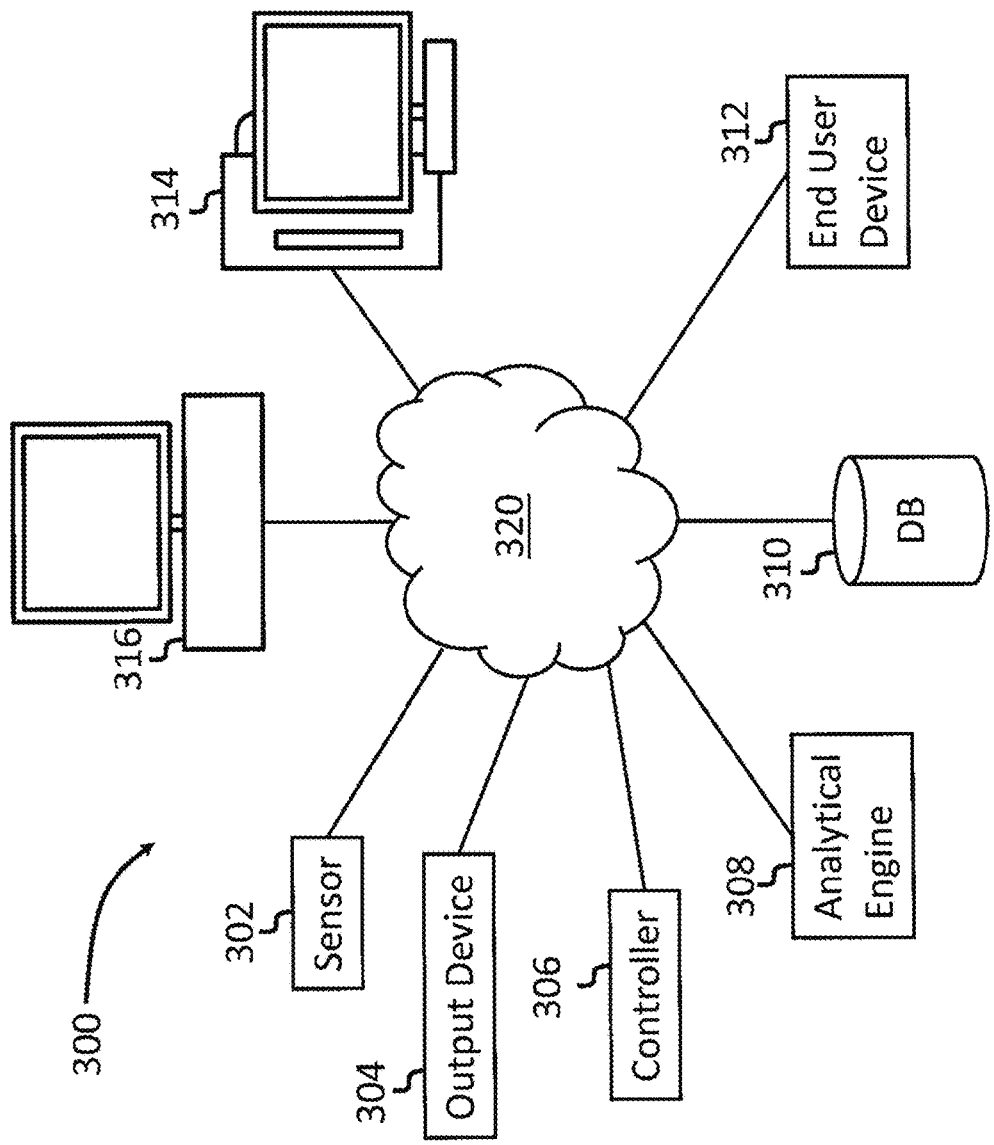
FIG. 4 is a block diagram illustrating an example of a plurality of electronic devices in electronic communication as part of an Internet of Things (IoT) system according to some embodiments of the present invention.

FIG. 4 is a block diagram illustrating an example of a plurality of electronic devices in electronic communication as part of an IoT system according to some embodiments of the present invention. An IoT system 300 includes various electronic devices 302 through 316, which communicate with each other over a communication network 320 to achieve results either with minimum or very little human intervention or without any human intervention (e.g., non-men-in-the-loop). The various electronic devices may include one or more of: a sensor 302; an output device 304; a controller 306; an analytical engine 308; a databases or mass storage devices 310; an end user or electronic device 312 (e.g., personal computer, handheld personal computer, personal digital assistant, tablet or touch screen computer system, mobile or cellular telephone, smartphone, smart watch, wearable electronic device, virtual reality headset, household appliance, and/or any other suitable consumer electronic device); and computer systems 314 and 316 (e.g., laptop, desktop, and server/host).

The electronic devices 302 through 316 may be in electrical communication with one another (e.g., using any suitable wired or wireless communication configuration and protocol, for example, MQTT or CoAP) by way of the communication network 320. The communication network 320 may be any suitable communication network, for example, a local area network or a wide area network (e.g., the Internet).

The data is generated by sensors included in one or more of the electronic devices 302 through 316, and the sensor data is accumulated and/or analyzed to achieve a result. In many cases, the result or the decision may be achieved in real-time or in a much smaller amount of time than a human being would be capable of achieving.

Many of the electronic devices 302 through 316 may be mobile devices, such that the devices may be supplied with portable power sources, such as rechargeable or replaceable batteries. Also, the form factor of the portable power sources may be influenced by the nature of the user devices. For example, the portable power sources may be bendable or rollable to support various configurations of user devices such as wearable devices that have various different form factors. Additionally, the electronic devices 302 through 316 may include various smart household appliances or electronic devices with network connectivity capabilities, or components of such devices.

Different devices and processors located at various different locations may be able to work together to process the accumulated data and/or to work together to come up with a solution to a particular problem.

Over the network, which may be a computer network, the modularized components and/or devices and/or software can communicate with each other to jointly generate or obtain a solution. Also, because of the availability of data on an individual basis, any solutions that are produced can be customized (or tailored) to suit the requirements of the individuals at that time.

While IoT is related to accumulation, processing, and analysis of data generated by sensors, and the implementation of solutions can be carried out without or with minimum human involvement, a man-machine interface (e.g., such as using display such as one requiring graphics user interface (GUI)) may be included in many situations for the devices to communicate with humans. Therefore, display devices, e.g., mobile display devices, or display devices incorporated into various electronic devices or household appliances, may be included as part of the IoT architecture.

Figure 5:
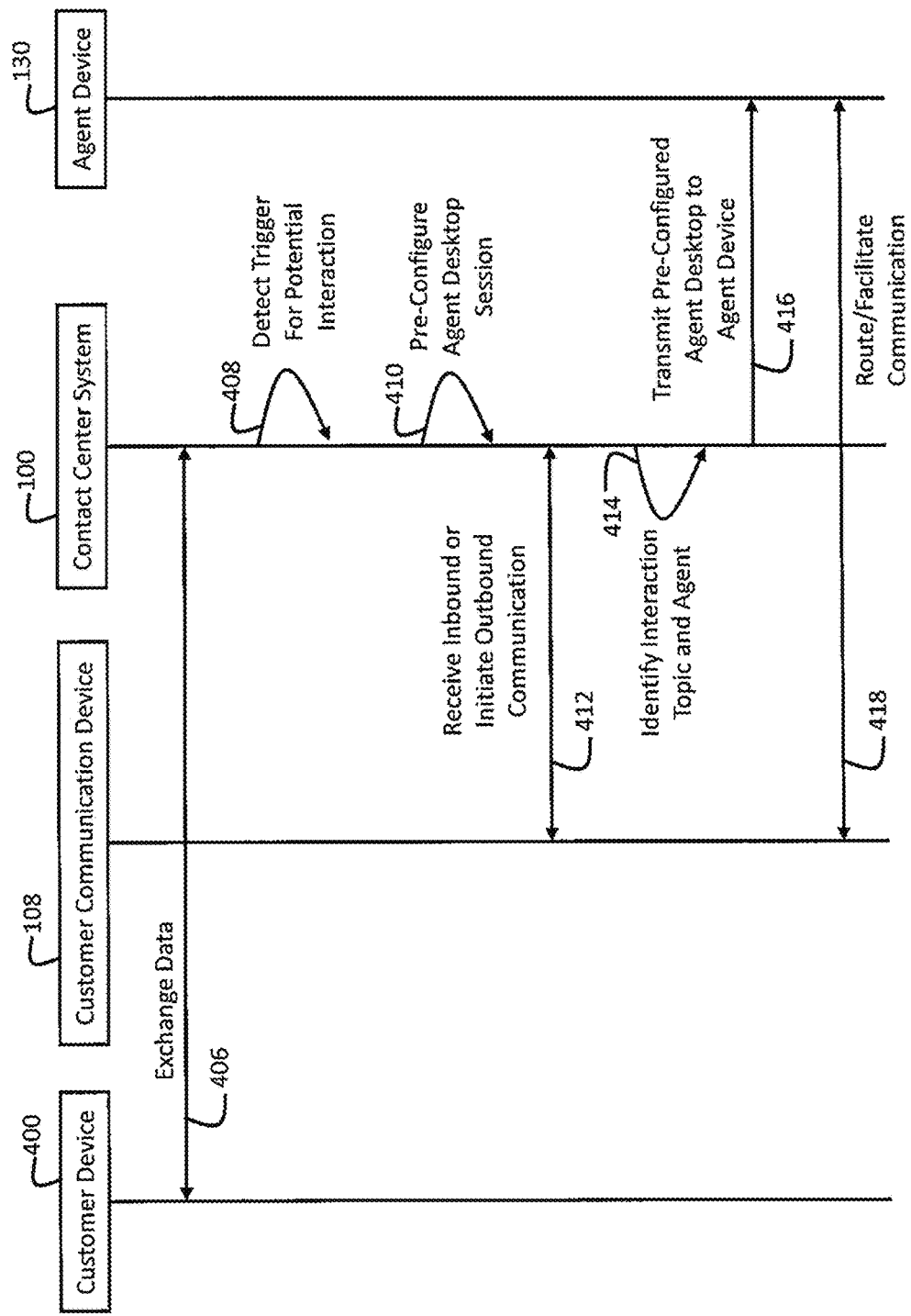
FIG. 5 illustrates a flow diagram for anticipating a user interaction in a customer contact center and generating or preloading an agent user interface according to some example embodiments of the present invention.

FIG. 5 is a signal flow diagram for anticipating a user interaction in a customer contact center and generating or preloading an agent user interface according to some example embodiments of the present invention. The process shown in FIG. 5 is merely to illustrate aspects of the present disclosure by way of an example use case, but embodiments of the present invention are not limited thereto. For example, the number and order of the operations illustrated in FIG. 5 may vary according to the particular use case being implemented by users.

Embodiments of the present invention may enable a contact center system to anticipate an upcoming interaction based on data received from customer devices, and generate or preload data and/or a customized user interface for presenting to an agent who handles the interaction. As illustrated in FIG. 5, a customer device 400 (e.g., end user devices 108 shown in FIG. 1, or electronic devices 302 through 316 shown in FIG. 4) may be in electronic communication with a contact center system (e.g., the contact center system 100) by way of a suitable communication network and interface. For example, for the purposes of illustration, a business 104 (see FIG. 1) may manufacture and sell smart refrigerators having various sensors for monitoring the status of various functions, components, or contents of the refrigerators, and the customer device 400 may be a smart refrigerator purchased by an individual customer of the business 104. Additionally, the business 104 may operate the contact center system 100 for providing various types of customer support to its customers.

While the customer device 400 is operating (e.g., at the home of the customer) and in communication with the contact center system 100, at operation 406, the customer device 400 may exchange data with the contact center system 100. For example, the customer device 400 may transmit data regarding the function or status of the customer device 400 to the contact center system 100 (e.g., the orchestration server 124 operating as part of the contact center 102). At operation 408, the contact center system 100 may detect, based on the data received from the customer device 400, a potential trigger for a customer interaction. For example, the contact center system 100 may identify that a function or component of the customer device 400 is failing or not functioning properly, and determine that the customer is likely to initiate an interaction with the contact center system 100 in an effort to resolve or mitigate the problem. In the example where the customer device 400 is a smart refrigerator, the contact center system 100 may receive data (at operation 406) generated by a sensor in the smart refrigerator indicating that a water filter within the refrigerator is due to be replaced, and (at operation 408) the contact center system 100 may anticipate or predict the customer is likely to desire to place an order for a new water filter. The data that may be transmitted by the smart refrigerator may include, for example, a unique identifier of the customer device 400, sensor data collected by the sensor in the customer device 400, and the like. In this regard, the sensor data provided by the customer device 400 may be a trigger to cause the contact center system to anticipate the potential interaction.

Although data provided by an IoT device is used as an example of a trigger for anticipating a user interaction, there might be other triggers that do not involve an IoT device. For example, recent discussions on various media platforms (e.g., social media) on topics related to a company's business, the location of a customer, the time of day, a calendar event or predefined historical event such as a one-year anniversary since the purchase of a particular piece of property for warranty purposes, and any other suitable trigger according to the design of the system.

At operation 410, in response to anticipating a potential interaction upon detecting the trigger event, the contact center system 100 may invoke the agent desktop configurator 200 to generate and pre-configure an agent desktop session based on a predicted interaction topic. The agent desktop session may be deemed to be a dummy session as the session is generated in the background, but not actively launched on the agent device at this point. For example, continuing with the example in which the customer device 400 is a smart refrigerator, the contact center system 100 may detect the trigger for the potential interaction at operation 408 by receiving or identifying data indicating a need to replace a water filter and, at operation 410, predict or anticipate an interaction for ordering a replacement water filter. Thus, the contact center system 100 may, at operation 410, invoke the desktop configurator 200 to generate a preconfigured or customized agent desktop session tailored for resolving the predicted topic of the interaction. For example, the contact center system 100 may retrieve (e.g., from various components of the contact center system 100, which are the same as or similar to those described above with respect to FIG. 1) customer profile data (e.g., customer name, address, demographic, language, etc.), and data about the product(s) or service(s) relevant to the predicted topic of the predicted interaction. The contact center system 100 may further retrieve data for executing and displaying various graphical user interface tools or modules for facilitating the interaction, such as interfaces for troubleshooting technical issues, ordering and shipping products, opening or closing accounts, checking customer account balances, micro-app interfaces such as payment, calendar event scheduler, pickup locator for taxi service, sketch designer for house furniture order, clothes selector, theater/plane/train seat selector, and any other suitable function or tool that may be relevant to the predicted interaction topic.

The contact center system 100 may then generate or preconfigure a virtual GUI desktop or dashboard (collectively referred to as a virtual GUI) including the relevant retrieved data and tools, and store the virtual GUI in the cache memory 205 (e.g., or at a particular agent's desktop such as the preferred agent of a customer who is expected to call, or at a neutral or central location from which the data can then be transferred to a selected agent if the anticipated call actually arrives). According to one embodiment, the virtual GUI is stored in association with all or a portion of the data provided by the customer device 400 in operation 406. For example, the virtual GUI may be stored in association with a device ID of the customer device 400. The virtual GUI may be stored for some period of time, and then discarded when no interaction is received as anticipated. Such period of time may vary, for example, based on the detected trigger.

At operation 412, the contact center system 100 may receive an inbound communication initiated by the customer or initiate an outbound communication to the customer. For example, according to some embodiments, a customer operating the customer communication device 108 may initiate a communication or interaction with the contact center system 100 using any suitable communication channel such as telephony, SMS text, chat, and the like. According to some embodiments, instead of waiting for a customer to initiate the communication, the contact center system 100 may initiate, in response to detecting the trigger for the potential interaction (at operation 408), an outgoing communication or interaction with the customer communication device 108 on any suitable communication channel.

At operation 414, the contact center system 100 may identify an interaction topic and an agent for routing the communication. At the beginning or early stages of the communication, for example, the contact center system 100 may receive input from the customer by way of the customer communication device 108 to identify the topic or purpose of the interaction. For example, the contact center system 100 may ask the customer to answer one or more questions (e.g., "How may we help you today?") or ask the customer to navigate through a series of interactive menu options in order to identify the topic or purpose of the interaction.

In some embodiments, the interaction topic may be inferred based on, for example, caller information. For example, if the caller number is associated with a customer identified as having purchased the customer device 400, and sensor data was recently been received from the customer device, an inference may be made that that the call may relate to the sensor data.

Additionally, the contact center system 100 may identify an available agent for handling the interaction using any suitable routing strategy. For example, according to some embodiments, the contact center system 100 may identify a pool of one or more agents having an appropriate skill level or training for handling the interaction based on the identified topic, and select an agent from the pool of agents based on agent availability. According to some embodiments, the contact center system 100 may select the agent for routing the interaction from the pool of agents based on the agent having certain knowledge data, resource data, functions, or tools already cached or preloaded on the agent's local communication device. For example, the contact center system 100 may identify an agent from the pool of agents who already has certain troubleshooting or knowledge data preloaded or cached on the agent's local communication device because the agent has recently handled a similar troubleshooting interaction.

Once the agent for routing the interaction has been identified, at operation 416, the contact center system 100 may determine whether a virtual GUI has been preloaded into the cache memory 205, and upon an affirmative determination, the desktop session/virtual GUI that was generated may be launched on the agent device, causing the agent device 130 to execute and display the GUI. In this regard, the contact center system 100 may transmit data to the agent device 130 operated by the identified agent to enable the agent to view the pre-configured agent desktop session and interact with the pre-configured tools and data generated based on the predicted interaction. This may entail, for example, updating the model 214 of the GUI 201 in the agent device 130 operated by the identified agent.

At operation 418, the contact center system 100 may route and facilitate the communication between the customer communication device 108 and the agent device 130.

Thus, according to some embodiments of the present invention, the contact center system 100 may enable more efficient handling of interactions. By utilizing data received from electronic devices associated with (e.g., owned and/or operated by) customers, the contact center system 100 may be enabled to predict an interaction is likely to occur in response to identifying data or activity that may be a trigger for the interaction. Further, by predicting an interaction is likely, the contact center system 100 may be enabled to pre-configure an agent desktop specifically suited for handling the predicted interaction. The pre-configured agent desktop may be customized or unique to the specific customer and the interaction, thereby enabling the agent desktop to be uniquely tailored and/or more simplified compared to a more generic-purpose agent desktop.

Figure 6:
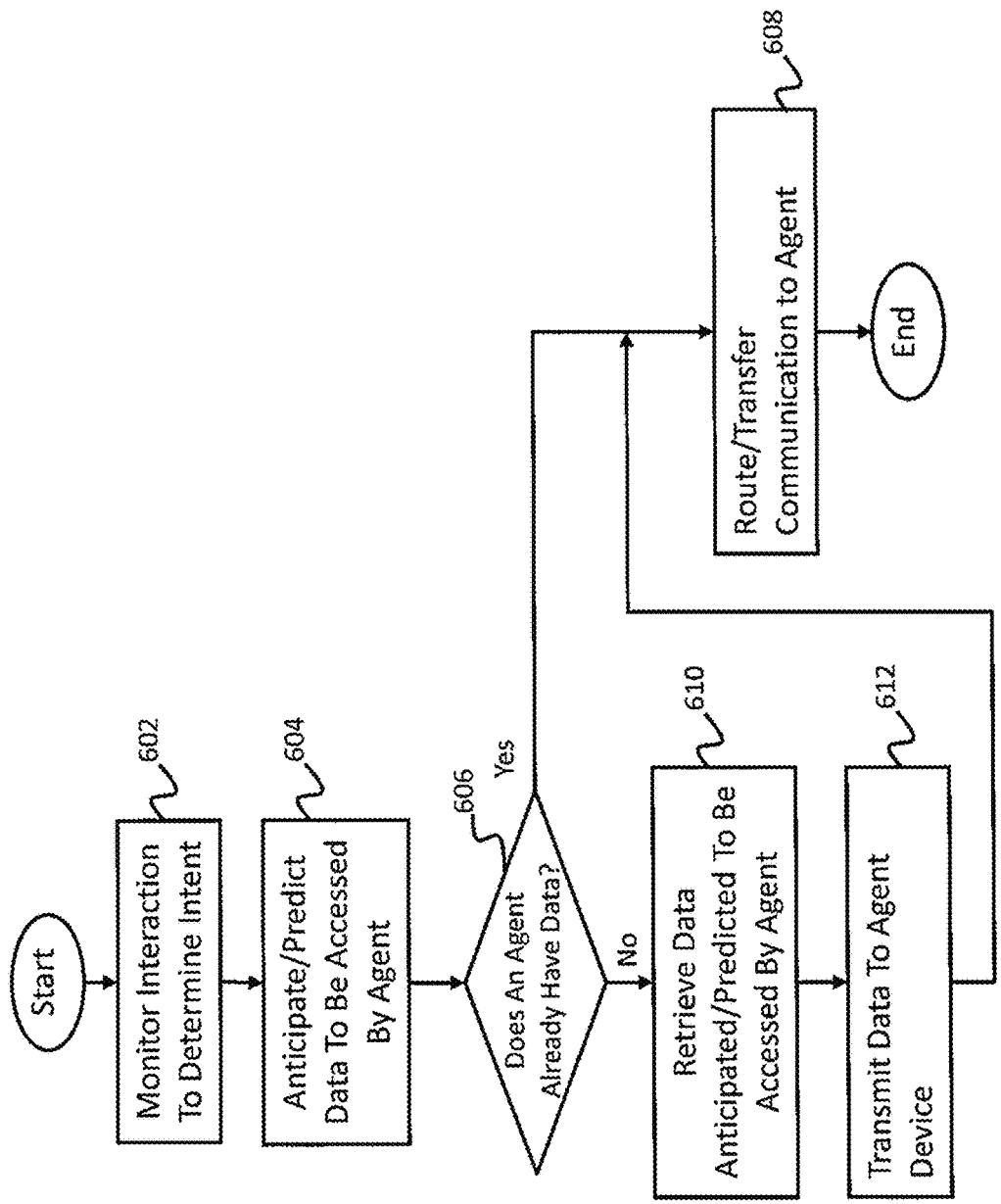
FIG. 6 is a flow diagram illustrating a process for anticipating data to be utilized by an agent during an interaction, according to some embodiments of the present invention.

FIG. 6 is a flow diagram illustrating a process for anticipating data to be utilized by an agent during an interaction, according to some embodiments of the present invention. The process may be implemented, for example, by the preloader/customizer module 203 described with respect to FIG. 2. The process starts and, at 602, the orchestration server 124 monitors an interaction to determine an intent or a topic of the interaction. According to some embodiments, the intent or topic of the communication may be determined after an interaction has been routed to an agent. Additionally, according to some embodiments, the intent or topic of a communication may be determined prior to routing to an agent.

At 604, the orchestration server 124 may anticipate and/or predict data, information, tools, menus, functions, and the like, that may be accessed or desired by an agent during the interaction. For example, prior to being routed to an agent, the customer may interact with the IMR 122 to answer one or more questions regarding the nature or purpose of the interaction. In some embodiments, the contact center system 100 may receive data from one of the electronic devices 302-316 owned or operated by (e.g., associated with) the customer to assist in identifying the topic or intent of the interaction. Based on the identified intent or topic of the interaction, the orchestration server 124 may then identify or predict data, tools, or information that may be desired or utilized by the agent during the interaction.

At 606, according to some embodiments, the orchestration server 124 may invoke the agent desktop configurator 200 to determine whether or not an agent device operating as part of the contact center system 100 already has the relevant data, tools, or information stored locally or available. If so, the orchestration server 124 may route or transfer the interaction to the agent device that already has the relevant data, tools, or information. For example, an agent may have recently interacted with another customer regarding a similar issue or topic, and therefore may have certain data that is predicted to be relevant to the present interaction already cached in the local memory of the agent device. In such instances, according to some embodiments, the contact center system 100 may route the interaction to the agent (or the agent device associated with the agent) who already has the information. In the case where the interaction is already being handled by a first agent, the contact center system 100 may transfer the interaction to a second agent who already has access to the relevant data, rather than transmitting such data to the first agent.

If, at 606, an agent does not already have the relevant data, the desktop configurator 200 may retrieve the data, at 610, from various resources within the contact center system 100 (e.g., the knowledge management server 150, the database 126, etc.). Additionally, in some embodiments, the operation at 606 may be omitted and the data may be retrieved at 610 after the operation at 604.

At 612, after retrieving the relevant data for the interaction, the desktop configurator 200 may transfer the data to the agent device and/or create or preconfigure an agent desktop, and proceed, at 608, to routing and/or transferring the communication to an agent (e.g., the agent device associated with an agent identified for handling the interaction), where the data may be displayed on the agent's device.

In some embodiments, consideration of data that is anticipated to be requested by an agent may also affect an agent that is selected for transfer, conferencing, and the like. According to some embodiments, the data could be preloaded to the device of the agent receiving the transfer, or the GUI information of the transferring agent may be transferred to the device of the agent receiving the transfer.

Thus, according to embodiments of the present invention, a contact center system may be configured to monitor interactions and anticipate data that may be requested or utilized by an agent prior to the agent requesting the data. By anticipating the needs or desires of agents to access data, the contact center system may then be enabled to preload or preconfigure the data to be displayed on the agent's local device, thereby allowing the agent to effectively and efficiently handle interactions with reduced latency that may otherwise by caused from data transmission.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the example embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 7A:
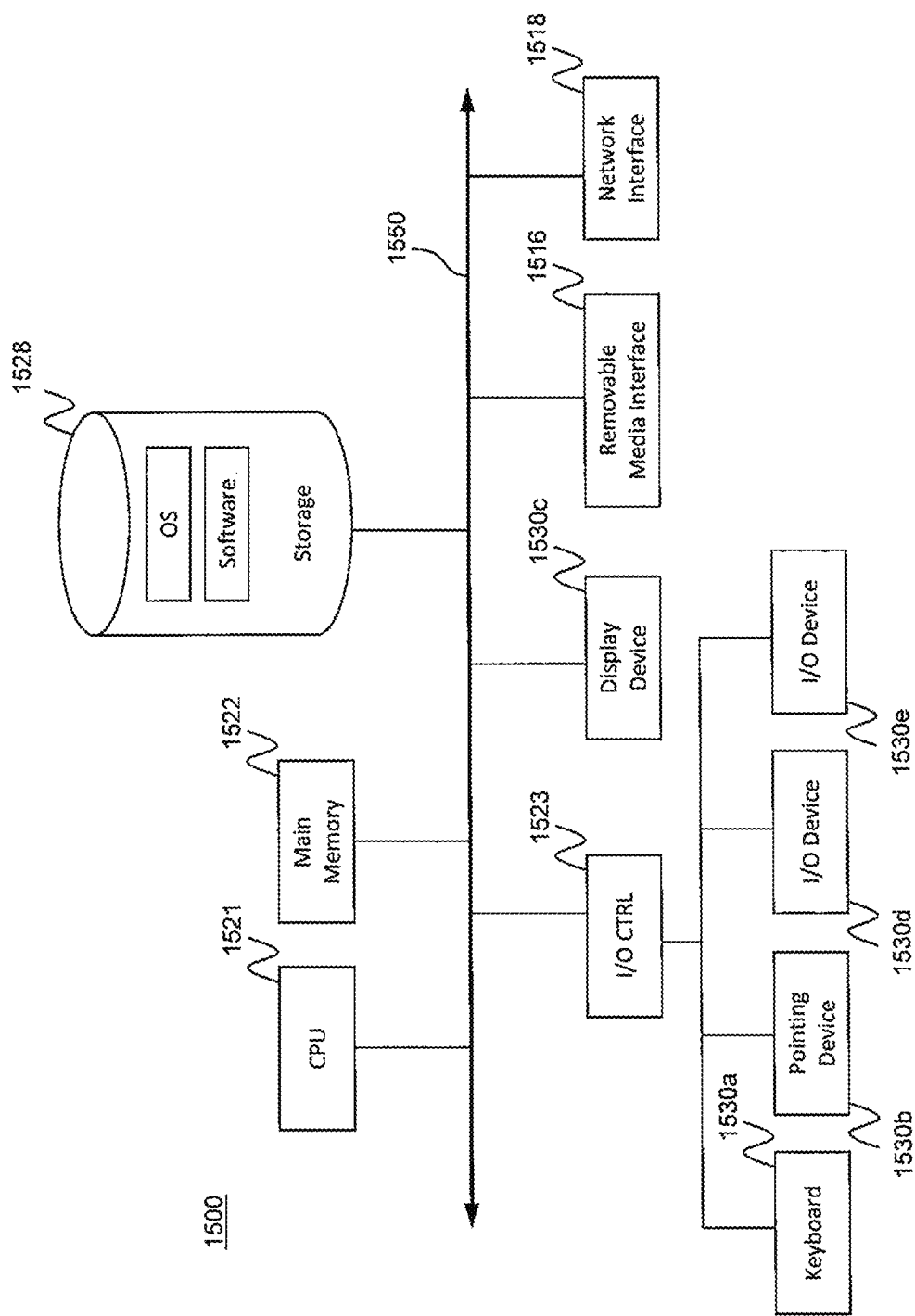
FIG. 7A is a block diagram of a computing device according to an embodiment of the present invention.
Figure 7B:
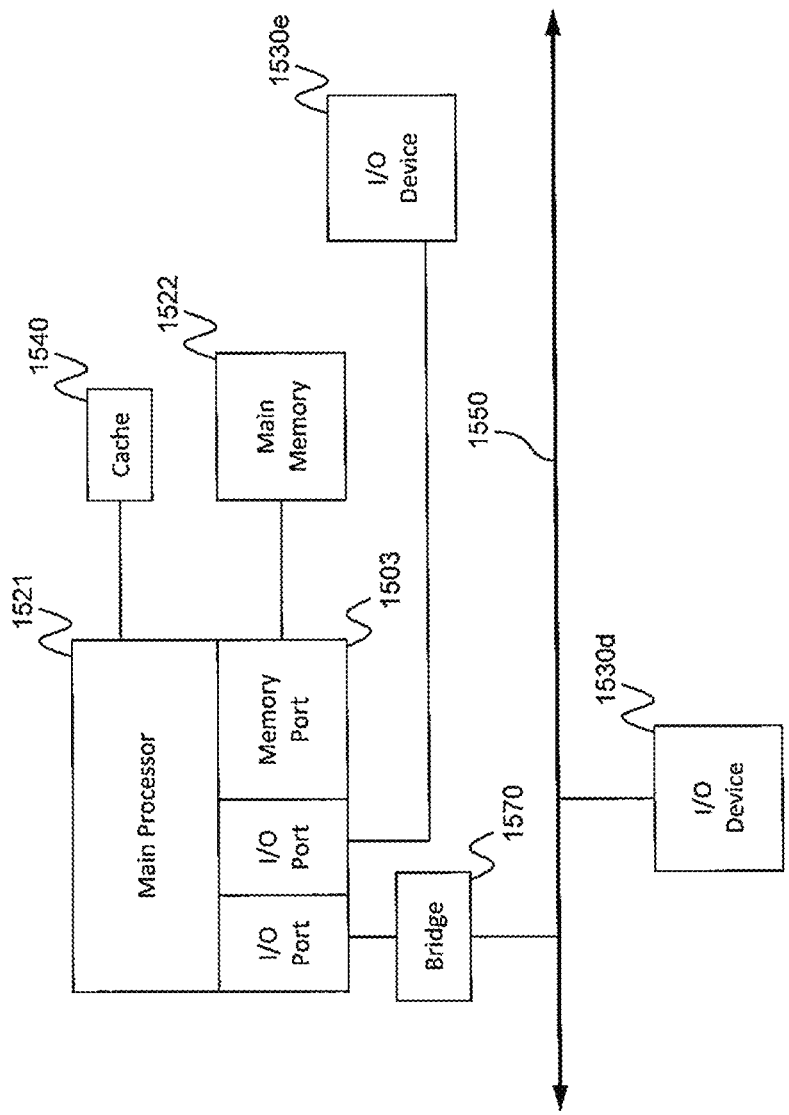
FIG. 7B is a block diagram of a computing device according to an embodiment of the present invention.

FIG. 7A and FIG. 7B depict block diagrams of a computing device 1500 as may be employed in example embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 7D:
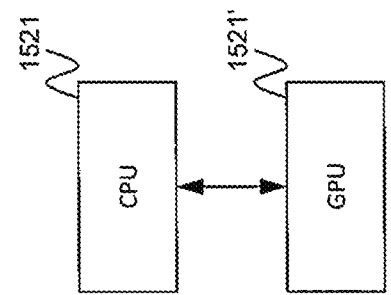
FIG. 7D is a block diagram of a computing device according to an embodiment of the present invention.
Figure 7C:
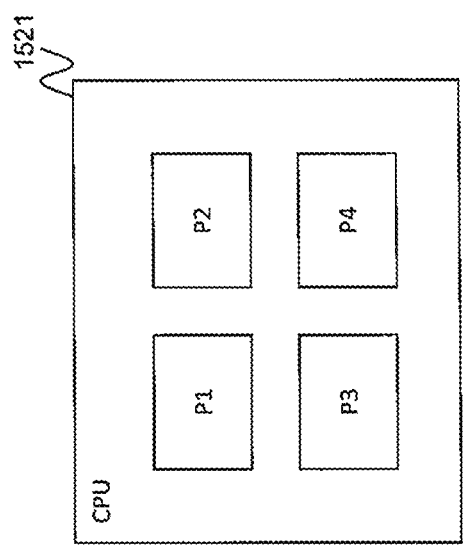
FIG. 7C is a block diagram of a computing device according to an embodiment of the present invention.

As shown in FIG. 7C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one example embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
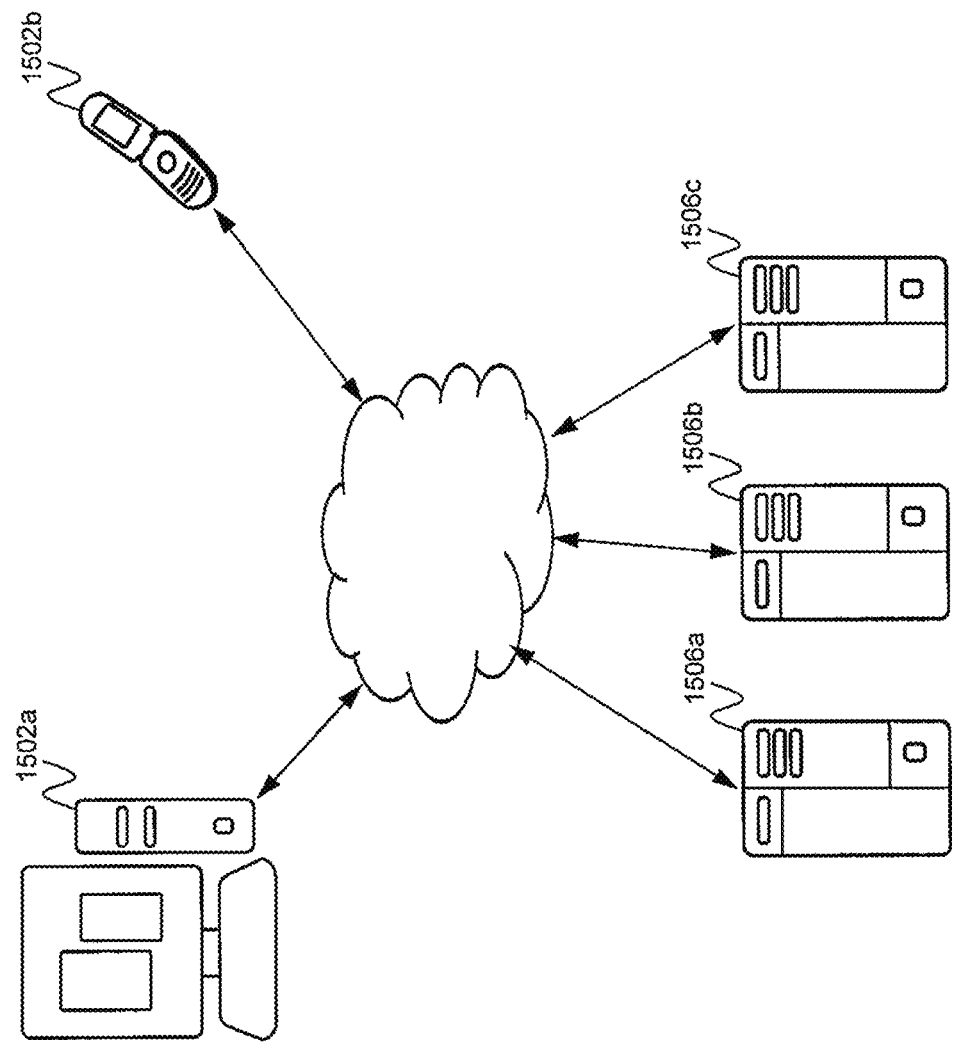
FIG. 7E is a block diagram of a network environment including several computing devices according to an embodiment of the present invention.

A computing device may be one of a plurality of machines connected by a network, or it may comprise a plurality of machines so connected. FIG. 7E shows an example network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for anticipating and preloading data in a customer contact center, the method comprising:
monitoring, by a processor, an interaction of an agent of the customer contact center, with an agent device, during a communication session with a customer of the customer contact center;
anticipating, by the processor, data to be accessed during a communication session;
retrieving, by the processor, the data anticipated to be accessed during the communication session;
pre-loading, by the processor in a memory device, a graphical agent desktop configured to display the data, the graphical agent desktop including a graphical representation of the data anticipated to be accessed during the communication session;
detecting, by the processor, a request for the data; and
providing, by the processor, the graphical agent desktop configured to display the data for output on the agent device in response to the request.

2. The method of claim 1, further comprising refraining from outputting the data on the agent device until the request is detected.

3. The method of claim 1, wherein the interaction is with a graphical user interface hosted by the agent device.

4. The method of claim 1, wherein the anticipating is based on anticipating a next interaction of the agent with the agent device.

5. The method of claim 4, wherein the next interaction is anticipated based on monitoring progress of an agent script.

6. The method of claim 4, wherein the next interaction is anticipated based on monitoring state of a model of a graphical user interface hosted by the agent device.

7. The method of claim 1, wherein the memory device is cache memory.

8. The method of claim 1, wherein the anticipating is based on a location of the customer.

9. The method of claim 1, wherein the anticipating is based on a time of day of the interaction.

10. The method of claim 1, wherein the anticipating is based on occurrence of a predefined calendar event.

11. A system for anticipating and preloading data in a customer contact center, the system comprising:
a processor; and
a memory coupled to the processor, wherein the memory stores instructions that, when executed by the processor, cause the processor to:
monitor an interaction of an agent of the customer contact center, with an agent device, during a communication session with a customer of the customer contact center;
anticipate data to be accessed during a communication session;
retrieve the data anticipated to be accessed during the communication session;
pre-load, in a memory device, a graphical agent desktop configured to display the data, the graphical agent desktop including a graphical representation of the data anticipated to be accessed during the communication session;
detect a request for the data; and
provide the graphical agent desktop configured to display the data for output on the agent device in response to the request.

12. The system of claim 11, further comprising refraining from outputting the data on the agent device until the request is detected.

13. The system of claim 11, wherein the interaction is with a graphical user interface hosted by the agent device.

14. The system of claim 11, wherein the anticipating is based on anticipating a next interaction of the agent with the agent device.

15. The system of claim 14, wherein the next interaction is anticipated based on monitoring progress of an agent script.

16. The system of claim 14, wherein the next interaction is anticipated based on monitoring state of a model of a graphical user interface hosted by the agent device.

17. The system of claim 11, wherein the memory device is cache memory.

18. The system of claim 11, wherein the anticipating is based on a location of the customer.

19. The system of claim 11, wherein the anticipating is based on a time of day of the interaction.

20. A system for anticipating and preloading data in a customer contact center, the system comprising:
means for monitoring an interaction of an agent of the customer contact center, with an agent device, during a communication session with a customer of the customer contact center;
means for anticipating data to be accessed during a communication session;
means for retrieving the data anticipated to be accessed during the communication session;
means for pre-loading, in a memory device, a graphical agent desktop configured to display the data, the graphical agent desktop including a graphical representation of the data anticipated to be accessed during the communication session;
means for detecting a request for the data; and
means for providing the graphical agent desktop configured to display the data for output on the agent device in response to the request.

* * * * *